US007419160B1

(12) United States Patent
D'Ambrosio

(10) Patent No.: US 7,419,160 B1
(45) Date of Patent: Sep. 2, 2008

(54) BACCARAT GAME

(75) Inventor: Stephen J. D'Ambrosio, Norwich, CT (US)

(73) Assignee: New Action Gaming, LLC, Middlebury, CT (US)

( * ) Notice: Subject to any disclaimer, the term of this patent is extended or adjusted under 35 U.S.C. 154(b) by 294 days.

(21) Appl. No.: 11/237,594

(22) Filed: Sep. 27, 2005

(51) Int. Cl.
*A63F 1/00* (2006.01)
*A63F 13/00* (2006.01)

(52) U.S. Cl. ......................... 273/292; 273/274; 463/12; 463/39

(58) Field of Classification Search ................. 273/292, 273/274, 309; 463/12, 13, 39
See application file for complete search history.

(56) References Cited

U.S. PATENT DOCUMENTS 5,395,119 A * 3/1995 Jacob et al. ................. 273/274
5,673,917 A * 10/1997 Vancura ....................... 273/292
2001/0028147 A1* 10/2001 Ornstein et al. ............. 273/292
2004/0047287 A1* 3/2004 Tremblay et al. ........... 370/229

* cited by examiner

*Primary Examiner*—Benjamin H Layno
(74) *Attorney, Agent, or Firm*—Rob L. Phillips; Greenberg Traurig

(57) ABSTRACT

A method of conducting a Baccarat game incorporating one or more side wagers is disclosed. The side wagers are dependent upon the number of cards dealt during the Baccarat hand and may be incorporated into all types of Baccarat games including Mini and Midi games. Accordingly, players may place wagers on whether 4, 5 or 6 cards will be dealt during the Baccarat hand. In one version, a payout of 3 to 2 is paid on winning wagers dependent on 4 cards being dealt and a payout of 2 to 1 is paid on winning wagers dependent upon 5 and 6 cards being dealt. Importantly, the side wagers do not impact the play of the conventional Baccarat game. While ideal for a live game, the side wagers are also suitable for electronic gaming devices, online and mobile versions.

19 Claims, 9 Drawing Sheets

210 220 200-1

240 230 250

| BET | PROBABILITY | HOUSE EDGE |
|---|---|---|
| BANKER | 45.96% | 1.01% |
| PLAYER | 44.68% | 1.29% |
| TIE | 9.36% | 15.75% |

1 DECK 200-2

| BET | PROBABILITY | HOUSE EDGE |
|---|---|---|
| BANKER | 45.88% | 1.05% |
| PLAYER | 44.63% | 1.24% |
| TIE | 9.49% | 14.59% |

4 DECKS 200-3

| BET | PROBABILITY | HOUSE EDGE |
|---|---|---|
| BANKER | 45.87% | 1.06% |
| PLAYER | 44.63% | 1.24% |
| TIE | 9.51% | 14.44% |

6 DECKS 200-4

| BET | PROBABILITY | HOUSE EDGE |
|---|---|---|
| BANKER | 45.86% | 1.06% |
| PLAYER | 44.62% | 1.24% |
| TIE | 9.52% | 14.36% |

8 DECKS

*FIG. 2*

520 530 500-1

| NUMBER OF CARDS | % PROBABILITY | PAY | % HOUSE EDGE |
|---|---|---|---|
| 4 | 37.8925 | 1.5 | 5.2687 |
| 5 | 30.3540 | 2 | 8.9381 |
| 6 | 31.7535 | 2 | 4.7395 |

6 DECKS 500-2

| NUMBER OF CARDS | % PROBABILITY | PAY | % HOUSE EDGE |
|---|---|---|---|
| 4 | 37.8868 | 1.5 | 5.2829 |
| 5 | 30.3444 | 2 | 8.9667 |
| 6 | 31.7687 | 2 | 4.6938 |

8 DECKS

*FIG. 4*

BACCARAT GAME

FIELD OF THE INVENTION

The embodiments of the present invention relate to the casino game of Baccarat. More particularly, a side bet based on the number of cards exposed during a Baccarat hand.

BACKGROUND

Baccarat is a popular casino game that is often played by high rollers. However, Baccarat is also offered with table limits appealing to all players. In Baccarat typically 6 or 8 decks of standard playing cards are used. The cards are shuffled and placed in a shoe from which they are dealt during the play of the game. Prior to the deal, each bettor can make one of the following wagers: 1) that the banker hand will win; 2) that the player hand will win; or 3) that the banker hand and the player hand will tie. After all bets are made, two cards are dealt from the shoe to the banker position and two cards are dealt from the shoe to the player position on the table layout. More specifically, the cards are dealt one to the player, one to the banker, one to the player and one to the banker. The cards are turned face up and the value of the banker hand the player hand is determined.

Aces count one; tens and face cards count zero and the other cards count their respective face value. The suits have no meaning. The highest hand value in Baccarat is nine. All hand values range from 0 to 9. If when the cards are added together, the total of the hand exceeds nine, then the hand value is determined by subtracting ten from the total of the hand. For example, a seven and an eight total fifteen, but the hand value is 5. An Ace and a nine total ten, but the hand value is 0. In other words, for two digit values, only the ones digit is used to determine the value. Whichever of the banker hand or the player hand is closest to a total of 9 is the winner.

A two-card hand value of 8 or 9 is known as a “natural” and a two-card total of 0 is known as a “Baccarat.” If either the player or the banker hand has a natural on the first two cards, the hand with the highest point total is declared the winner (or the hand is a tie). If neither the player nor the banker hand has a natural, then there is a possibility of a third card draw, as will be explained in detail below. The value of the third card is added to the total of the first two cards to obtain a new value. Again, if the new hand total exceeds 9, the hand value is determined by using the ones digit.

The object of the game of Baccarat is for the bettor to successfully wager on whether the banker hand or the player hand is going to win. The bettor receives even money for his wager if he selects the winning hand or side and loses his wager if he selects the losing hand or side. Because of the rules of play of Baccarat, the banker hand has a slightly higher chance of winning than does the player hand. Therefore, if the bettor wagers on the banker hand, the bettor must pay a 5% commission of the amount the bettor wins. No commission is charged if the bettor successfully wagers on the player hand. The 5% commission is boxed and is paid by the player prior to leaving the table. In other words, rather than paying the commission each time it is due, the house tracks and aggregates the commissions due from each player during the gaming session and the players pay the total amount of commissions before leaving the table.

Winning wagers on the tie hand bet are paid off at 9 to 1 or 8 to 1 odds (depending on the casino). If a tie hand occurs, all wagers on the banker hand and all wagers on the player hand are “pushes” and the amount wagered is returned to the bettor.

Other than the tie wager, which provides a large house edge of 4.8% to 15.75%, the probabilities associated with Baccarat wagers are quite small relative to the normal casino wager. Depending on the number of decks used, banker wagers provide a corresponding house edge of 1.01% to 1.06% and player wagers provide a corresponding house edge of 1.24% to 1.29%. Accordingly, for players to win at Baccarat, they must be on the right side of a streak of outcomes or must get lucky and consistently place the correct wager. In other words, other than the tie wager, the game requires large wagers to accumulate large wins. Moreover, the game can become stale over a long gaming session.

Consequently, there is the need to heighten the excitement level of Baccarat by incorporating additional wagers providing higher returns while maintaining a mutually desirable house edge. That is, the house must continue to have the edge but not at such a high level that the additional wagers are never placed. Moreover, the additional wagers should be optional and have no impact on conventional and well-known Baccarat rules. Additionally, the new wagers must not impact player choices thereby maintaining the integrity of the underlying Baccarat game.

SUMMARY

Accordingly, a first embodiment of the present invention comprises a method of conducting a Baccarat game comprising accepting one or more game wagers on a bank or a player; providing a side wager dependent upon a number of cards dealt during the Baccarat hand; causing the Baccarat hand to be played in a conventional manner; paying winning side wagers based on the number of cards dealt during the hand; and paying winning game wagers based on whether the banker or player won the hand.

The rules of Baccarat dictate that 4, 5 or 6 cards be dealt during a hand. Therefore, in a first embodiment, players are able to place side wagers on whether 4, 5 or 6 cards will be dealt during the next hand of Baccarat. Players may bet on one or two of the possibilities. Placing bets on all three would guarantee the player a negative outcome. Implementing the game requires modifying Baccarat table felts to include betting areas related to the side bet.

Other variations, embodiments and features of the present invention will become evident from the following detailed description, drawings and claims.

BRIEF DESCRIPTION OF THE DRAWINGS

FIG. 2 shows tables depicting the probabilities and house edges for conventional Baccarat played with 1, 4, 6 and 8 decks of playing cards;

FIG. 4 shows tables depicting the probabilities and house edges for the side wagers of the present invention.

DETAILED DESCRIPTION

Figure 1A:
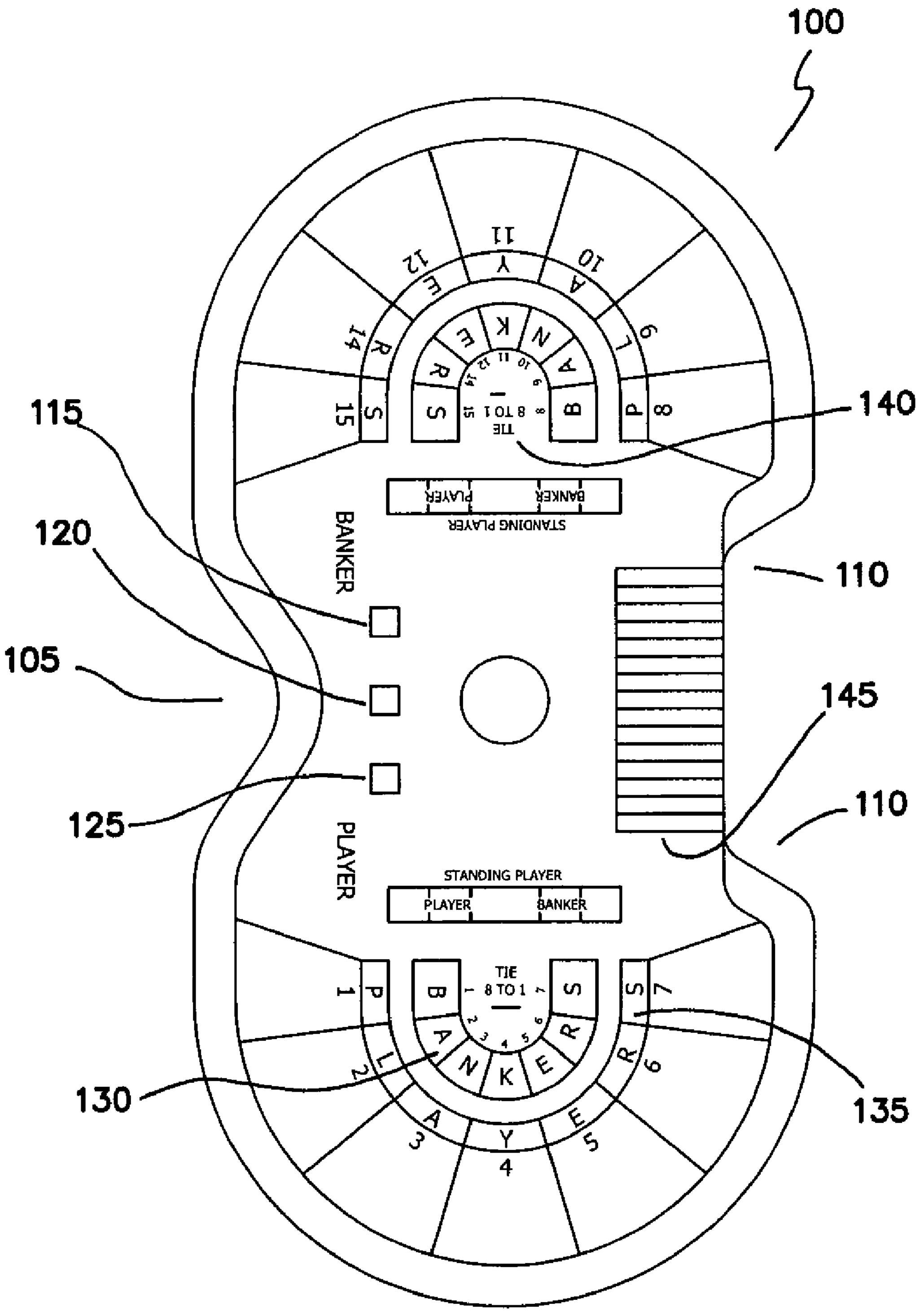
FIG. 1A shows a conventional full or Big Baccarat layout.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 1B:
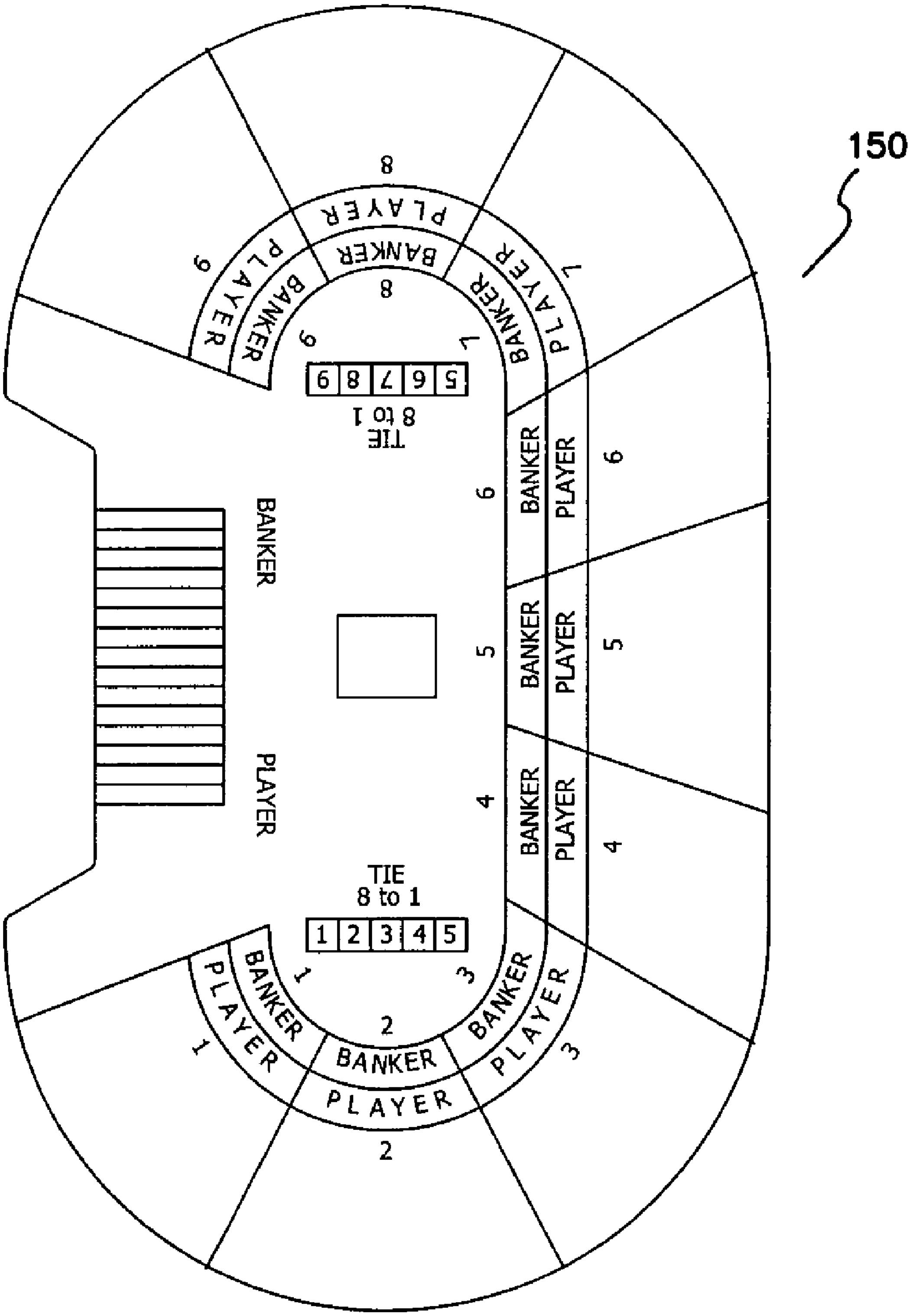
FIG. 1B shows a conventional Midi-Baccarat layout.
Figure 1C:
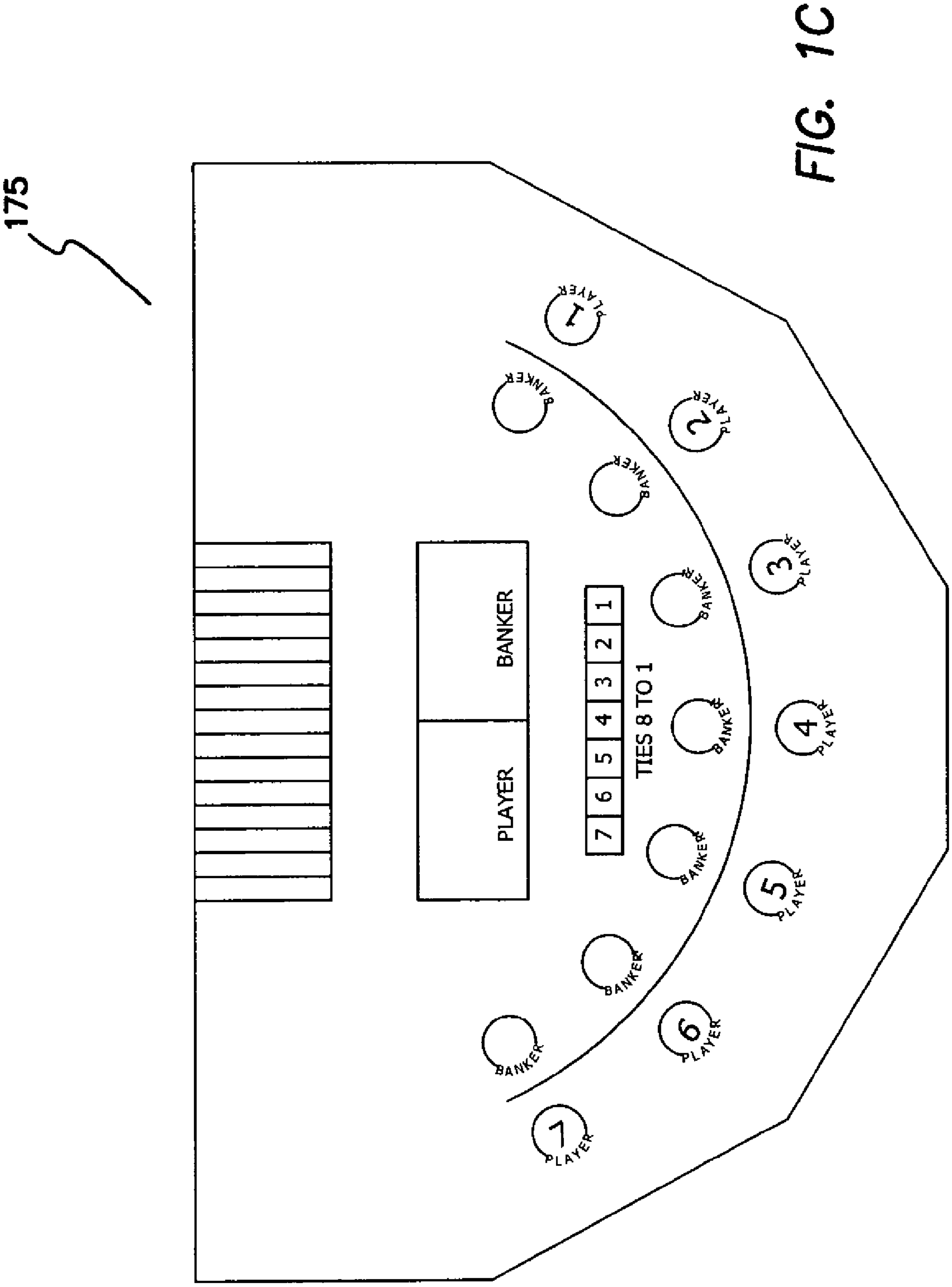
FIG. 1C shows a conventional Mini-Baccarat layout.

Reference is now made to the figures wherein like parts are referred to by like numerals throughout. FIG. 1A illustrates one version of a conventional full or Big Baccarat layout generally referred to by reference numeral 100. The layout 100, supported by a table, defines a stick position 105 and two base positions 110 and accommodates a drop box 115, discard trays 120 and a tips box 125. The table further accommodates up to fourteen players (routinely player number thirteen is removed for reasons of superstition). Each player position has a corresponding banker wager area 130, player wager area 135 and tie wager area 140. Commission boxes 145 are used to track player commissions owed to the house. Baccarat is also played at tables accommodating seven and nine players. In such embodiments, the layouts are similar to layout 100 (i.e., same wagers) but are supported by a different table configuration as shown in FIGS. 1B and 1C.

During play, the dealers occupying base positions 110 pay and collect wagers at their end of the table while the croupier occupying the stick position 105 manages the game. To begin a Baccarat game, a banker is first designated. Players then place wagers on the player or the banker. Players may also place a tie wager. Tie wagers are popular even though the tie wager has a very high house edge (e.g., 4.8% to 15.75%). The banker (bettor holding the shoe) then deals the cards in the following manner: He or she removes one card face down from the shoe and sends it face down to the stick person; removes a second card and slides it face down under the corner of the shoe; removes a third card from the shoe and sends it face down to the stick person; and removes a fourth card from the shoe and slides it under the corner of the shoe with the second card. The stick person then sends both player cards to the player having placed the highest wager. If two players have the same and highest wager, the cards are sent to the player having the highest wager and closest to the right of the bettor holding the shoe. Once the player with the highest placed wager has observed the player cards, he or she passes them back to the stick person in a face up position and the stick person turns over them over. The player holding the shoe who has dealt the cards observes the banker cards and delivers them face up to the stick person. Dealing cards in Mini-Baccarat and Midi-Baccarat is the responsibility of the dealer. There are various schemes for dealing cards in Mini and Midi-Baccarat. Most commonly, in Mini-Baccarat, the cards are handled by the dealer who exposes the player hand first and the banker hand second. In Midi-Baccarat, the cards are dealt by the dealer and may or may not be sent to the bettors. In both Mini and Midi-Baccarat, the cards end up exposed in front of the dealer. In all Baccarat games four initial cards are dealt and then standard casino rules are followed to determine whether one additional card is dealt to the player and/or the banker. The rules are as follows:

Player's Third Card Rule

If either the player or the banker have a total of 8 or 9 on the first two cards, no further cards are drawn. The resulting hand is called a "Natural" and the hand is over.

If the player's total is less than or equal to 5, the player draws a third card.

If the player does not draw a third card, then the banker stands on 6 or more and takes a third card on a total of 5 or less. If the player does draw a third card then the banker's third card rule below will determine if the bank takes a third card.

Banker's Third Card Rule

If the banker's total is 2 or less, then the banker draws a third card regardless of what the player's third card is.

If the banker's total is 3, then the banker draws a third card unless the player's third card was an 8.

If the banker's total is 4, then the banker draws a third card unless the player's third card was a 0, 1, 8 or 9.

If the banker's total is 5, then the banker draws a third card if the player's third card was a 4, 5, 6 or 7.

If the banker's total is 6, then the banker draws a third card if the player's third card was a 6 or 7.

If the banker's total is 7, then the banker stands.

FIG. 1B shows a Midi-Baccarat layout 150 and FIG. 1C shows a Mini-Baccarat layout 175. Midi Baccarat is a variation of Big Baccarat. In Midi-Baccarat, players may be permitted to handle the first two cards and up to nine players may play. Mini-Baccarat is played at a blackjack style table and accommodates up to seven players. Mini-Baccarat incorporates smaller wager levels and all cards are dealt and handled by a dealer. Regardless of the version, each of the aforementioned Baccarat games, and others like Macau Baccarat, requires 4, 5 or 6 cards to be dealt per hand thereby making each game suitable for the embodiments of the present invention.

Baccarat may be played with one to eight decks of playing cards. The tables 200-1 through 200-4 of FIG. 2 show the probabilities 210 and the house edge 220 for Baccarat played using 1, 4, 6 and 8 decks of playing cards. The tables include player wagers 230, banker wagers 240 and tie wagers 250. As evidenced by the tables 200-1 through 200-3, the tie wager 250 has a large house edge. Nonetheless, the wager is very popular based on the 8 to 1 or 9 to 1 payout.

Figure 3A:
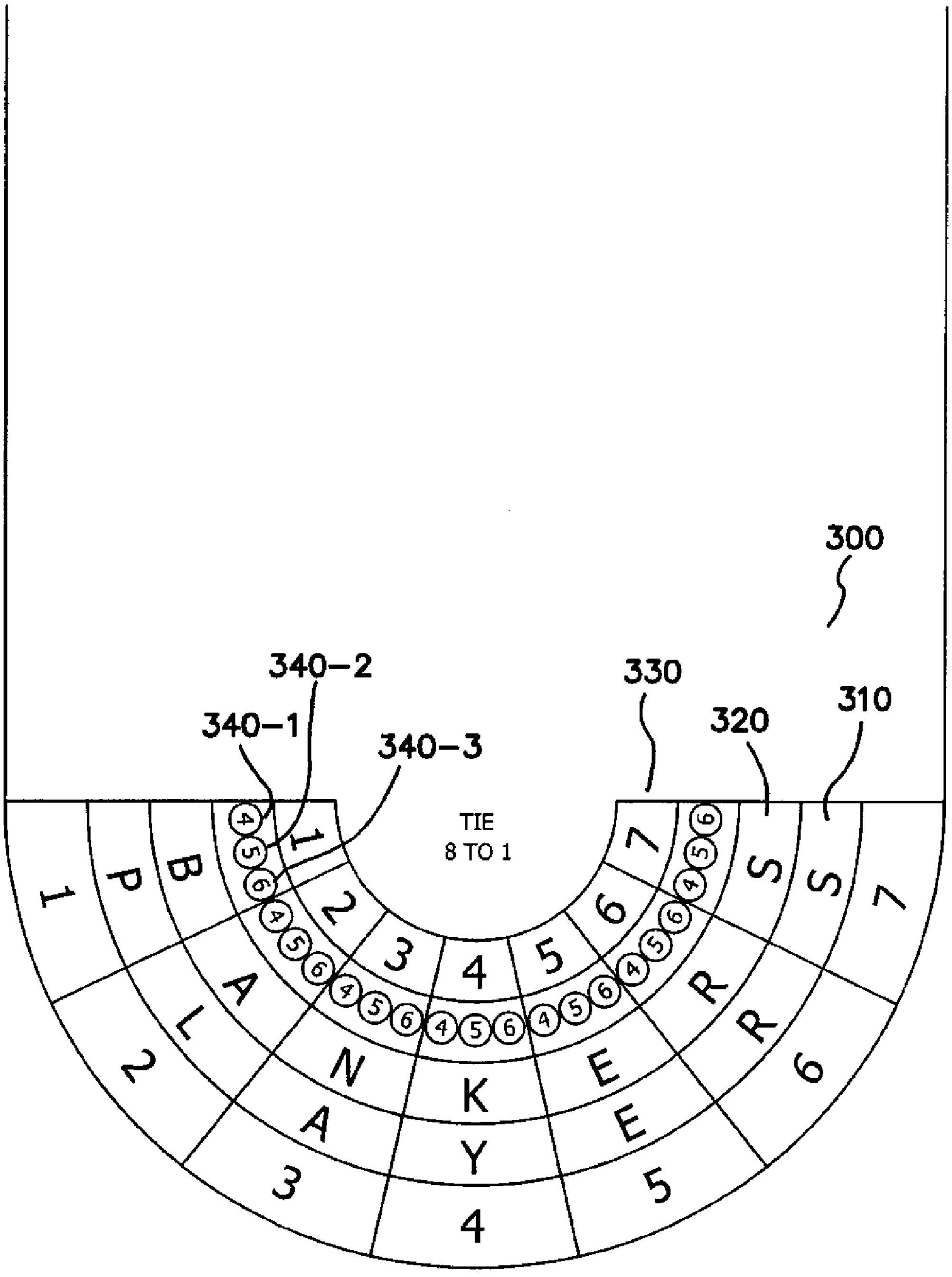
FIG. 3A shows a modified Baccarat layout for conducting a live embodiment of the present invention.

Pursuant to the Baccarat rules detailed above, a game of Baccarat utilizes a total or 4, 5 or 6 cards. FIG. 3A shows a modified Big Baccarat layout 300. As with all Baccarat layouts, each player position has a corresponding player wager area 310, banker wager area 320 and tie wager area 330.

The layout 300 further incorporates three additional wager areas 340-1 through 340-3 corresponding to a 4-card wager, 5-card wager and 6-card wager, respectively. The three additional wager areas 340-1 through 340-3 are positioned between the banker wager area 320 and tie wager area 330 such that the player must reach over them to place the popular tie wager. Similar 4-card, 5-card and 6-card wager areas may be placed on a layout for any and all Baccarat games. Moreover, the 4-card, 5-card and 6-card wager areas may be positioned in other locations on the layout.

In practice, the players may place wagers in wager areas 340-1 through 340-3 prior to the dealer announcing no more bets. Players may place a wager on one or two of the wager areas 340-1 through 340-3. Placing a wager on all three wager areas 340-1 through 340-3 guarantees a negative outcome for the player. Then, when the dealer announces the final result of the hand, he or she will be encouraged to supplement the announcement with the number of cards (e.g., "banker wins in 5" or "player wins in 6"). After the announcement, all losing wagers are collected and winning wagers are paid in a conventional manner. Ideally, for security reasons, the primary wagers (i.e., player and banker wagers) are resolved first. That is, the player wager area 310 and banker wager area 320 are nearest to the player and thus should be resolved such that no tampering occurs. However, in the event of a tie, the banker and player wagers are a push and the 4-card, 5-card and 6-card wagers placed in wager areas 340-1 through 340-3 are then resolved first—prior to any tie wagers. However, the casino offering the game may institute varied rules regarding the payout order.

Figure 3B:
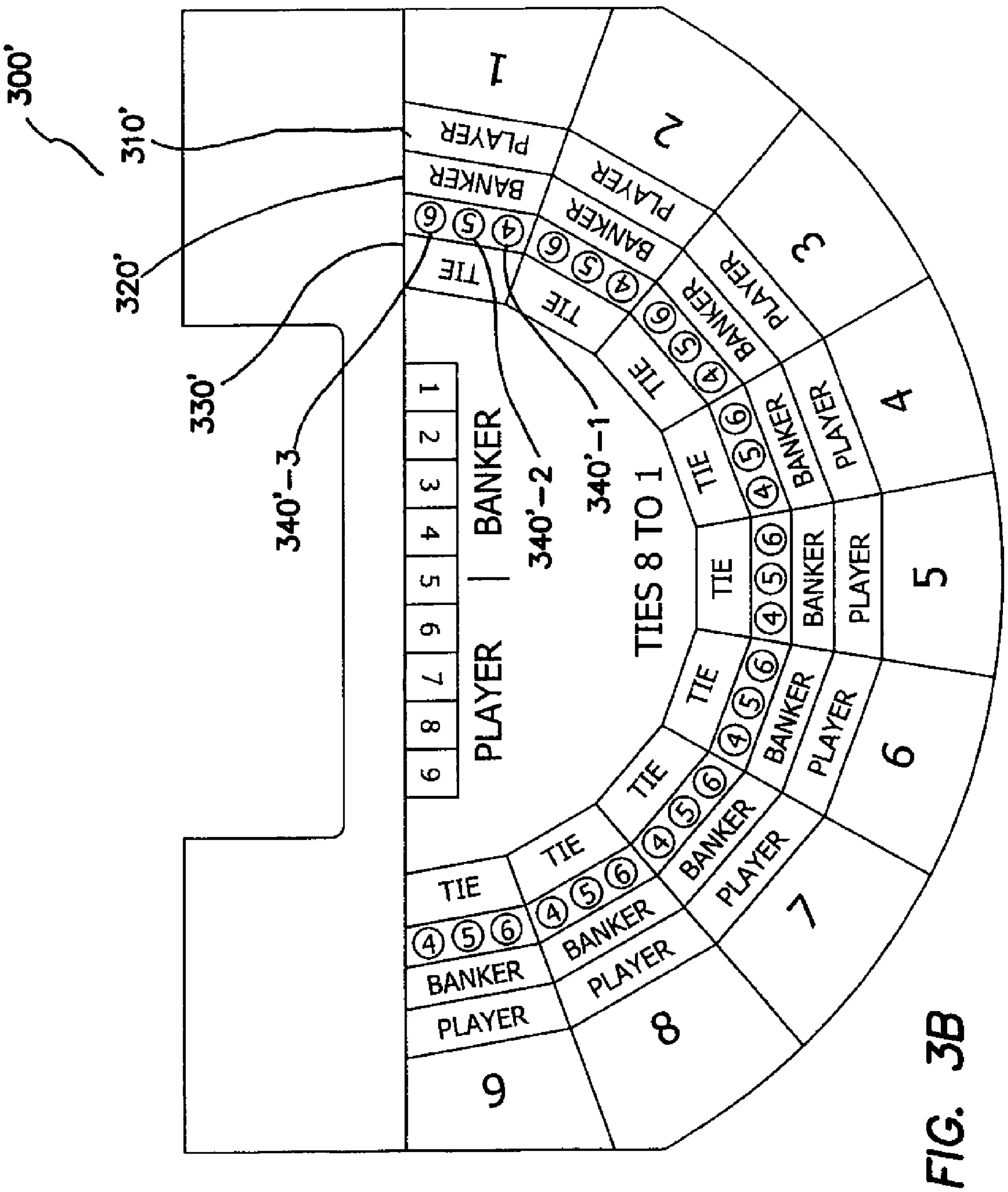
FIG. 3B shows a modified Midi-Baccarat layout for conducting a live embodiment of the present invention.
Figure 3C:
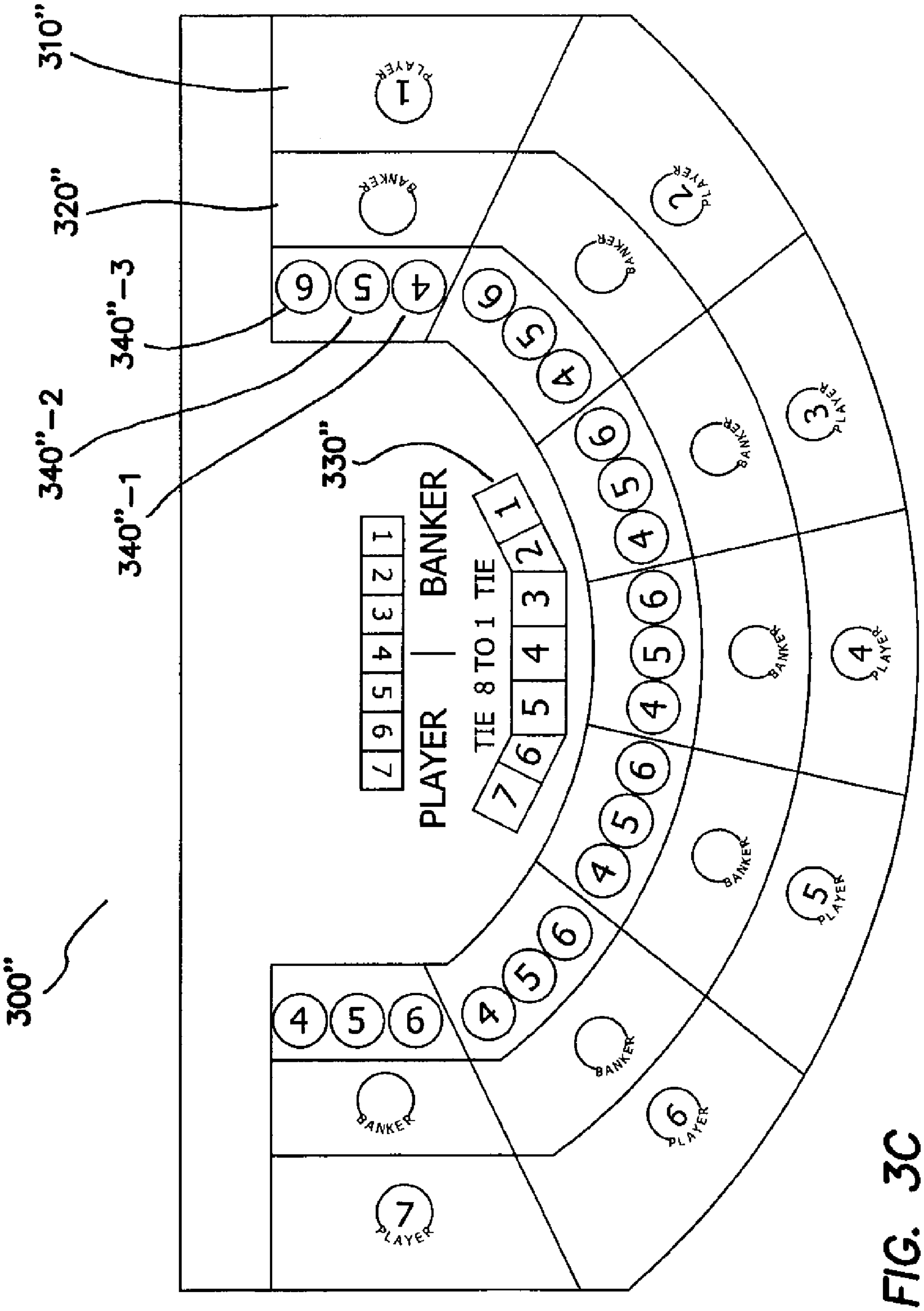
FIG. 3C shows a modified Mini-Baccarat layout for conducting a live embodiment of the present invention.

FIG. 3B shows a modified Midi-Baccarat layout 300' having player wager areas 310', banker wager areas 320', tie wager areas 330' and side wager areas 340'-1 through 340'-3. FIG. 3C shows a modified Mini-Baccarat layout 300" having player wager areas 310", banker wager areas 320", tie wager areas 330" and side wager areas 340"-1 through 340"-3.

FIG. 4 shows tables 500-1 and 500-2 depicting the probabilities 510, payout 520 and house edge 530 for 6 and 8 deck games incorporating the wagers of the present invention. As depicted in tables 500-1 and 500-2, the payout on winning wagers on 4 cards is 3 to 2 while winning wagers on 5 or 6 cards is 2 to 1. With these payouts and 6 decks of cards, the house edge 530 fluctuates between 4.7395% and 8.9381%. With 8 decks of cards, the house edge 530 fluctuates between 4.6938% and 8.9667%. Like any casino game, the house edge 530 may be manipulated by altering the value of the payouts 520.

While FIG. 3 shows a gaming layout 300 for a live version of Baccarat (i.e., Midi-Baccarat), it should be understood that the embodiments of the present invention are also equally suited for electronic gaming devices (e.g., stand-alone gaming machine), personal computers and online versions of Baccarat. Online games comprise accessing the software from a remote server. Nonetheless, the rules and payouts remain the same while the actions of the live dealers and croupier are replaced by virtual dealers and croupiers. In reality, computer software facilitates both the electronic gaming devices and online versions of the Baccarat game described herein.

Figure 5:
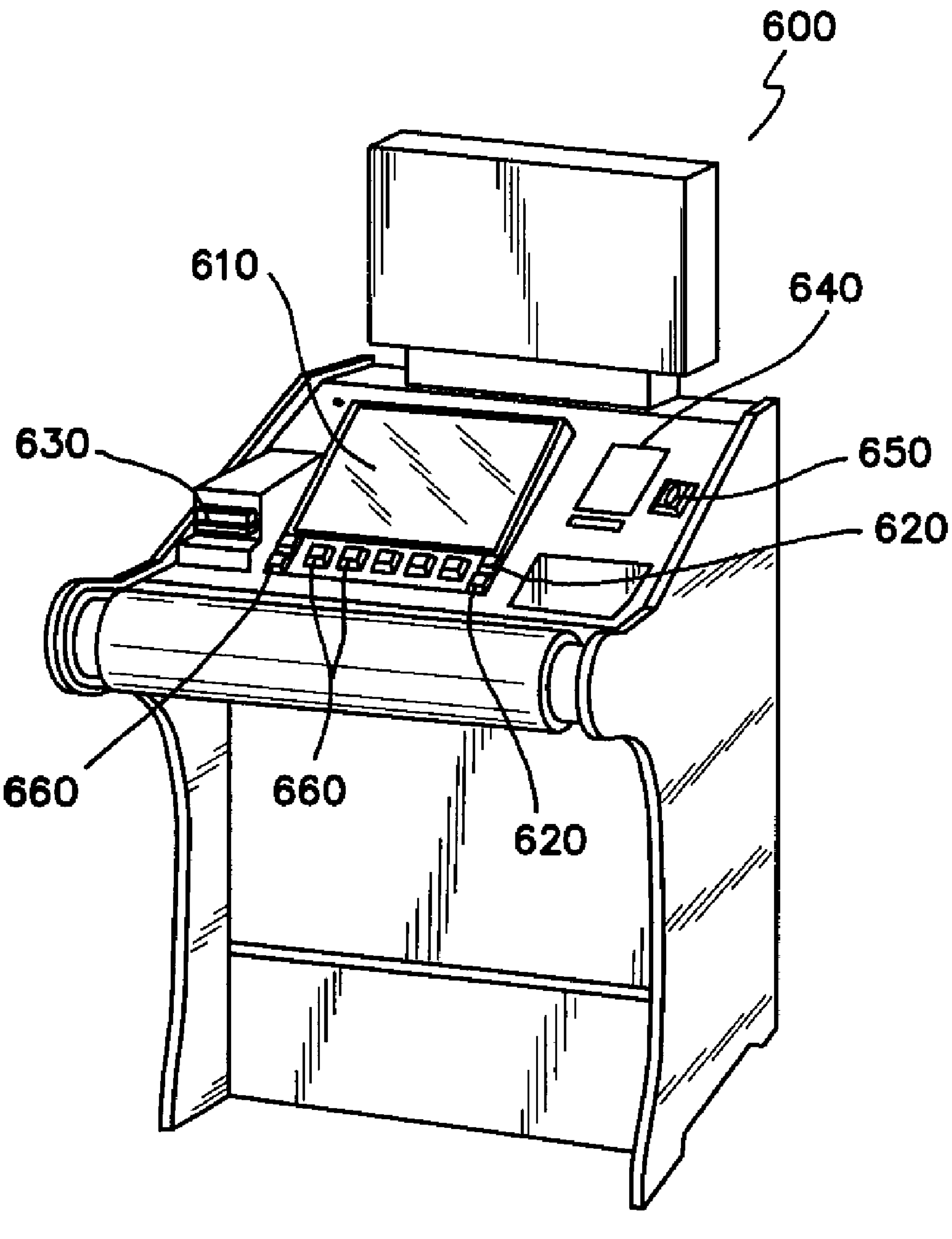
FIG. 5 shows an electronic gaming device for conducting an electronic embodiment of the present invention.

FIG. 5 shows a typical electronic gaming device 600 that may be used to facilitate an electronic version of the embodiments of the present invention. The device includes The external features of the gaming device 600 include a display 610, wager selection buttons 620, card reader 630, credit display 640, coin input 650 and player interface buttons 660. However, the display 610 may also comprise touch screen technology as the player interface. Optionally, the device 600 may include a currency or coupon reader and printer.

The operation of electronic gaming devices is controlled by microprocessors which communicate with internal memory devices and the external features of the machines. The microprocessors also incorporate, or communicate with, a random number generator which ensures the randomness of the outcomes. In the embodiments of the present invention, one or more processors, along with memory and related devices, control the new applications disclosed herein. Therefore, the embodiments, along with the corresponding payouts, of the present invention may be programmed into the processor or associated software. Moreover, the payouts and house edges shown in FIG. 4 may be altered for the electronic embodiments. Since the technology for operating and controlling electronic gaming devices is well known to those skilled in the art, the subtle details are not described herein.

Online and mobile embodiments of the present invention may be offered as well. An online embodiment allows players to access and play the Baccarat game described herein via a computer terminal linked to a network, ideally a global computer network. Mobile embodiments include accessing and playing the Baccarat game described herein via a hand-held device, cellular telephone, personal digital assistant or other similar device. Like the stand-alone electronic gaming devices, as shown in FIG. 5, the technology for operating and controlling online and mobile games of chance is well known to those skilled in the art such that the subtle details need not be described herein.

Advantageously, the simple side wagers described herein do not alter the rules of the well-known game of Baccarat thereby requiring minimal dealer (and player) training. As set forth above, the side wagers are relevant to all variations of Baccarat, including, Big Baccarat, Mini-Baccarat, Midi-Baccarat and Macau style Baccarat.

Although the invention has been described in detail with reference to several embodiments, additional variations and modifications exist within the scope and spirit of the invention as described and defined in the following claims.

I claim:

1. A method of conducting a Baccarat game comprising:

accepting one or more game wagers on a banker or a player;

providing a side wager dependent upon a number of cards dealt during the Baccarat hand;

causing the Baccarat hand to be played in a conventional manner whereby cards are dealt pursuant to a defined Baccarat procedure such that players and said banker have no control over the number of cards dealt;

paying winning side wagers based on a combined number of cards dealt to a player and banker during the hand; and paying winning game wagers based on whether the banker or player won the hand.

2. The method of claim 1 further comprising providing side wagers dependent on hand outcomes utilizing 4, 5 and 6 cards.

3. The method of claim 2 further comprising paying winning side wagers according to the following pay table:

| # of Cards | Payout (to 1) |
|---|---|
| 4 | 1.5 |
| 5 | 2 |
| 6 | 2. |

4. The method of claim 1 further comprising providing an electronic gaming device to facilitate the method.

5. The method of claim 1 further comprising providing software accessible by a computer, said software for facilitating the method.

6. The method of claim 1 further comprising providing computer software that can be downloaded wherein said software facilitates the method.

7. The method of claim 1 further comprising depicting areas for placing said side wagers on a conventional Baccarat layout between banker and tie wager areas.

8. The method of claim 1 further comprising a mobile device accessing software for facilitating the method.

9. The method of claim 8 further comprising selecting a mobile device from the group consisting of a hand-held unit, cellular telephone and personal digital assistant.

10. The method of claim 1 further comprising selecting a Baccarat game from the group consisting of Big Baccarat, Mini-Baccarat, Midi-Baccarat and Macau Baccarat.

11. A method of conducting a Baccarat game comprising:

accepting one or more game wagers on a banker or a player;

providing a side wager dependent upon a combined number of cards dealt to a player and banker during the Baccarat hand, said side wagers dependent upon 4, 5 or 6 cards being dealt during the hand of Baccarat;

causing the Baccarat hand to be played in a conventional manner whereby cards are dealt pursuant to a defined Baccarat procedure such that players and said banker have no control over the number of cards dealt;

paying winning side wagers based on whether 4, 5 or 6 cards were dealt during the hand; and paying winning game wagers based on whether the banker or player won the hand.

12. The method of claim 11 further comprising paying winning side wagers according to the following pay table:

| # of Cards | Payout (to 1) |
|---|---|
| 4 | 1.5 |
| 5 | 2 |
| 6 | 2. |

13. The method of claim 11 further comprising providing an electronic gaming device to facilitate the method.

14. The method of claim 11 further comprising providing software accessible by a computer, said software for facilitating the method.

15. The method of claim 11 further comprising allowing computer software that can be downloaded wherein said software facilitates the method.

16. The method of claim 11 further comprising depicting areas for placement of said side wagers on a conventional Baccarat layout between a banker wager area and a tie wager area.

17. The method of claim 11 further comprising a mobile device accessing software for facilitating the method.

18. The method of claim 17 wherein the mobile device is selected from the group consisting of a hand-held unit, cellular telephone and personal digital assistant.

19. The method of claim 11 further comprising selecting a Baccarat game from the group consisting of Big Baccarat, Mini-Baccarat, Midi-Baccarat and Macau Baccarat.

* * * * *